US010708804B2

(12) United States Patent
Damnjanovic et al.

(10) Patent No.: US 10,708,804 B2
(45) Date of Patent: *Jul. 7, 2020

(54) SYSTEMS AND METHODS FOR RADIO RESOURCE MANAGEMENT

(71) Applicant: QUALCOMM Incorporated, San Diego, CA (US)

(72) Inventors: Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,313

(22) Filed: Jan. 31, 2019

(65) Prior Publication Data

US 2019/0166515 A1    May 30, 2019

Related U.S. Application Data

(63) Continuation of application No. 15/368,179, filed on Dec. 2, 2016, now Pat. No. 10,200,906.

(Continued)

(51) Int. Cl.
*H04W 24/10* (2009.01)
*H04W 72/04* (2009.01)
(Continued)

(52) U.S. Cl.
CPC .......... *H04W 24/10* (2013.01); *H04W 16/10* (2013.01); *H04W 48/16* (2013.01);
(Continued)

(58) Field of Classification Search
CPC ..... H04W 24/10; H04W 16/10; H04W 48/16; H04W 72/082; H04W 72/0426; H04W 92/20

See application file for complete search history.

(56) References Cited

U.S. PATENT DOCUMENTS 8,830,849 B2    9/2014 Gaal et al.
8,982,853 B2    3/2015 Khude et al.
(Continued)

FOREIGN PATENT DOCUMENTS

CN    102300327 A    12/2011
CN    102652442 A    8/2012
(Continued)

OTHER PUBLICATIONS

International Search Report and Written Opinion—PCT/US2017/044637—ISA/EPO—dated Nov. 16, 2017.

(Continued)

*Primary Examiner* — Christine Ng
(74) *Attorney, Agent, or Firm* — Qualcomm IP Dept.; James Hunt Yancey, Jr.

(57) ABSTRACT

Systems and methods providing radio resource management (RRM) to facilitate the co-existence of the neighboring cells, such as to manage radio resources for deployments utilizing a same frequency or overlapping frequencies, using discovery signal transmission are disclosed. Discovery signal transmission may be used to enable network elements of a wireless communication system to discover other network elements of the wireless communication system, whether such other network elements are operating with respect to a cell of a same or different operator. Transmission of discovery signals may be utilized to detect situations of dominant interference, whereby the network elements of neighboring cells may provide protected resources for each other. The protected resources may comprise particular frequencies, time slots, channels, etc.

30 Claims, 14 Drawing Sheets

Related U.S. Application Data

(60) Provisional application No. 62/382,932, filed on Sep. 2, 2016.

(51) Int. Cl.
*H04W 72/08* (2009.01)
*H04W 16/10* (2009.01)
*H04W 48/16* (2009.01)
H04W 88/04 (2009.01)
H04W 92/20 (2009.01)

(52) U.S. Cl.
CPC ..... *H04W 72/0426* (2013.01); *H04W 72/082* (2013.01); *H04W 88/04* (2013.01); *H04W 92/20* (2013.01)

(56) References Cited

U.S. PATENT DOCUMENTS

| | | | |
|---|---|---|---|
| 8,982,907 B2 | 3/2015 | Skjegstad et al. | |
| 9,072,110 B2 | 6/2015 | Chen et al. | |
| 10,200,906 B2* | 2/2019 | Damnjanovic | H04W 24/10 |
| 2003/0162535 A1* | 8/2003 | Nishiyama | H04W 48/12 455/422.1 |
| 2011/0319066 A1 | 12/2011 | Chou et al. | |
| 2012/0087261 A1* | 4/2012 | Yoo | H04L 25/03 370/252 |
| 2012/0115469 A1* | 5/2012 | Chen | H04W 76/10 455/434 |
| 2012/0207025 A1 | 8/2012 | Barbieri et al. | |
| 2014/0106769 A1* | 4/2014 | Bai | H04W 52/244 455/452.1 |
| 2014/0171073 A1* | 6/2014 | Kim | H04W 48/16 455/434 |
| 2015/0056989 A1* | 2/2015 | Lee | H04W 48/16 455/434 |
| 2015/0173086 A1 | 6/2015 | Karaman et al. | |
| 2015/0195774 A1 | 7/2015 | Lee et al. | |
| 2016/0037549 A1 | 2/2016 | Seo et al. | |
| 2016/0294595 A1* | 10/2016 | Harada | H04L 27/2646 |
| 2017/0142764 A1* | 5/2017 | Yasukawa | H04W 92/18 |
| 2017/0318491 A1* | 11/2017 | Chen | H04L 1/0026 |
| 2018/0070256 A1 | 3/2018 | Damnjanovic et al. | |

FOREIGN PATENT DOCUMENTS

| | | |
|---|---|---|
| CN | 103686985 A | 3/2014 |
| CN | 104938021 A | 9/2015 |
| KR | 20160036674 A | 4/2016 |
| WO | WO-2014137781 A2 | 9/2014 |

OTHER PUBLICATIONS

Kosta C., et al., "On Interference Avoidance Through Inter-Cell Interference Coordination (ICIC) Based on OFDMA Mobile Systems", IEEE Communications Surveys and Tutorials, Institute of Electrical and Electronics Engineers, vol. 15, No. 3, Jul. 1, 2013, pp. 973-995, XP011523258, ISSN: 1553-877X, DOI: 10.1109/SURV. 2012.121112.00037.

<Span style="font-family: calibri;">LG Electronics: "Inter-Cell Coordination for Efficient Small Cell Operation", 3GPP TSG RAN WG1 Meeting #72b, R1-131302, Agenda Item—7.2.5,3.1, Apr. 15-19, 2013, pp. 1-7.

Taiwan Search Report—TW106125770—TIPO—dated Sep. 24, 2019.

* cited by examiner

SYSTEMS AND METHODS FOR RADIO RESOURCE MANAGEMENT

CROSS-REFERENCE TO RELATED APPLICATIONS

This application claims the benefit of U.S. Provisional Patent Application No. 62/382,932, entitled, "SYSTEMS AND METHODS FOR RADIO RESOURCE MANAGEMENT," filed on Sep. 2, 2016, and claims benefit of and is a continuation of U.S. patent application Ser. No. 15/368,179, entitled, "SYSTEMS AND METHODS FOR RADIO RESOURCE MANAGEMENT," filed on Dec. 2, 2016, the disclosure of each of which is hereby incorporated by reference herein in its entirety as if fully set forth below and for all applicable purposes.

TECHNICAL FIELD

Aspects of the present disclosure relate generally to wireless communication systems, and more particularly, to radio resource management. Certain embodiments of the technology discussed below can enable and provide efficient interference management features and techniques for efficient and power-conserving communication systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

For example, as more base stations are deployed to provide added wireless coverage and/or capacity, issues with respect to co-existence become more prevalent. Base stations of neighboring cells, whether associated with a same operator or different operators, may utilize one or more of the same frequencies, whereby the transmissions by the base stations and/or UEs of the neighboring cells may present interference with respect to one another. In some situations, the base stations may be deployed in such a way (e.g., in a shadow of the neighboring base station's transmission, a relatively far distance from the neighboring base station, etc.) that these base stations may be unable to detect the transmissions of the neighboring base station. Further exasperating the problem, the base stations may be deployed in such a way that these base stations may be unable to detect the transmission of the UEs of the neighboring cell. Accordingly, management of radio resources to facilitate the co-existence of the neighboring cells is often impossible or inadequate.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for providing radio resource management in a wireless communication system is provided. The method includes monitoring, by one or more network elements associated with a first cell, for transmission of a discovery signal from network elements associated with a second cell, and determining one or more protected resources when a discovery signal is detected. The method further includes provisioning the one or more protected resources to avoid an instance of dominant interference by at least one network element associated with the first cell with respect to wireless communications in the second cell based at least in part upon the discovery signal detected.

In a further aspect of the disclosure, an apparatus for providing radio resource management in a wireless communication system is provided. The apparatus includes means for monitoring, by one or more network elements associated with a first cell, for transmission of a discovery signal from network elements associated with a second cell, and means for determining one or more protected resources when a discovery signal is detected. The apparatus further includes means for provisioning the one or more protected resources to avoid an instance of dominant interference by at least one network element associated with the first cell with respect to wireless communications in the second cell based at least in part upon the discovery signal detected.

In a still further aspect of the disclosure, a non-transitory computer-readable medium having program code recorded thereon for providing radio resource management in a wireless communication system is provided. The program code includes program code for causing one or more computers to monitor, by one or more network elements associated with a first cell, for transmission of a discovery signal from network elements associated with a second cell, and determine one or more protected resources when a discovery signal is detected. The program code further includes program code for causing one or more computers to provision the one or more protected resources to avoid an instance of dominant interference by at least one network element associated with the first cell with respect to wireless communications in the second cell based at least in part upon the discovery signal detected.

In a yet further aspect of the disclosure, an apparatus for providing radio resource management in a wireless communication system is provided. The apparatus includes at least one processor and a memory coupled to the at least one processor. The at least one processor is configured to monitor, by one or more network elements associated with a first cell, for transmission of a discovery signal from network elements associated with a second cell, and to determine one or more protected resources when a discovery signal is detected. The at least one processor is further configured to provision the one or more protected resources to avoid an instance of dominant interference by at least one network element associated with the first cell with respect to wireless communications in the second cell based at least in part upon the discovery signal detected.

In one aspect of the disclosure, a method for providing information for radio resource management in a wireless communication system is provided. The method includes monitoring, by one or more user equipments (UEs) associated with a first cell, for transmission of a discovery signal from network elements associated with a second cell, and reporting, by the one or more UEs, detecting transmission of a discovery signal from a network element associated with the second cell, wherein the reporting provides information for facilitating provisioning one or more protected resources to avoid an instance of dominant interference by the one or more UEs associated with the first cell with respect to wireless communications in the second cell.

In a further aspect of the disclosure, an apparatus for providing information for radio resource management in a wireless communication system is provided. The apparatus includes means for monitoring, by one or more user equipments (UEs) associated with a first cell, for transmission of a discovery signal from network elements associated with a second cell, and means for reporting, by the one or more UEs, detecting transmission of a discovery signal from a network element associated with the second cell, wherein the reporting provides information for facilitating provisioning one or more protected resources to avoid an instance of dominant interference by the one or more UEs associated with the first cell with respect to wireless communications in the second cell.

In a still further aspect of the disclosure, a non-transitory computer-readable medium having program code recorded thereon providing information for radio resource management in a wireless communication system is provided. The program code includes program code for causing one or more computers to monitor, by one or more user equipments (UEs) associated with a first cell, for transmission of a discovery signal from network elements associated with a second cell, and report, by the one or more UEs, detecting transmission of a discovery signal from a network element associated with the second cell, wherein the reporting provides information for facilitating provisioning one or more protected resources to avoid an instance of dominant interference by the one or more UEs associated with the first cell with respect to wireless communications in the second cell.

In a yet further aspect of the disclosure, an apparatus for providing information for radio resource management in a wireless communication system is provided. The apparatus includes at least one processor and a memory coupled to the at least one processor. The at least one processor is configured to monitor, by one or more user equipments (UEs) associated with a first cell, for transmission of a discovery signal from network elements associated with a second cell, and to report, by the one or more UEs, detecting transmission of a discovery signal from a network element associated with the second cell, wherein the reporting provides information for facilitating provisioning one or more protected resources to avoid an instance of dominant interference by the one or more UEs associated with the first cell with respect to wireless communications in the second cell.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
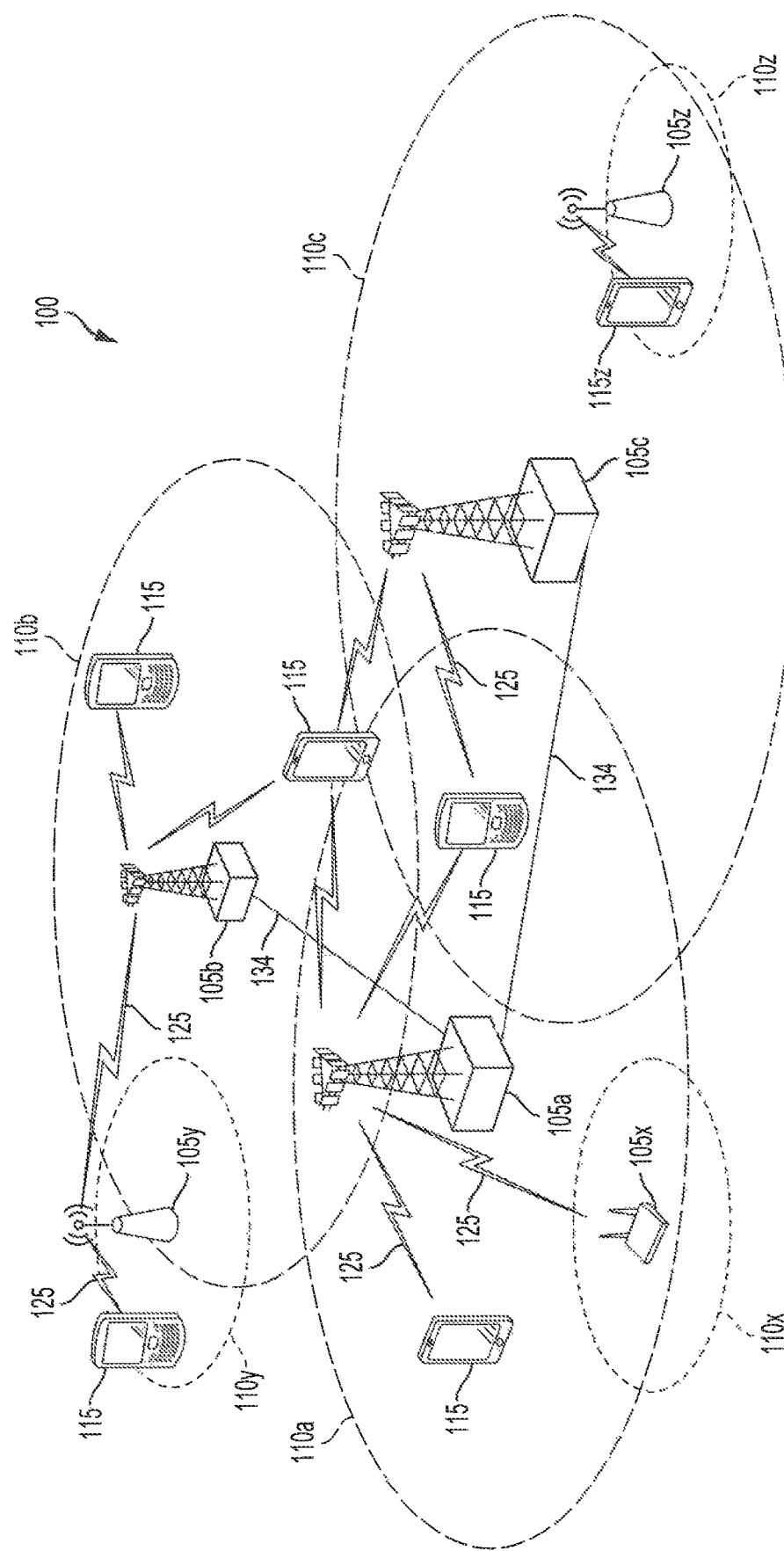
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation networks. As appreciated by those skilled in the art, components appearing in FIG. 1 are likely to have related counterparts in other network arrangements.

Turning back to FIG. 1 wireless network 100 includes a number of base stations, such as may comprise evolved node Bs (eNBs), referred to herein as eNBs 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105$a$, 105$b$ and 105$c$ are macro eNBs for the macro cells 110$a$, 110$b$ and 110$c$, respectively. eNBs 105$x$, 105$y$, and 105$z$ are small cell eNBs, which may include pico or femto eNBs that provide service to small cells 110$x$, 110$y$, and 110$z$, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
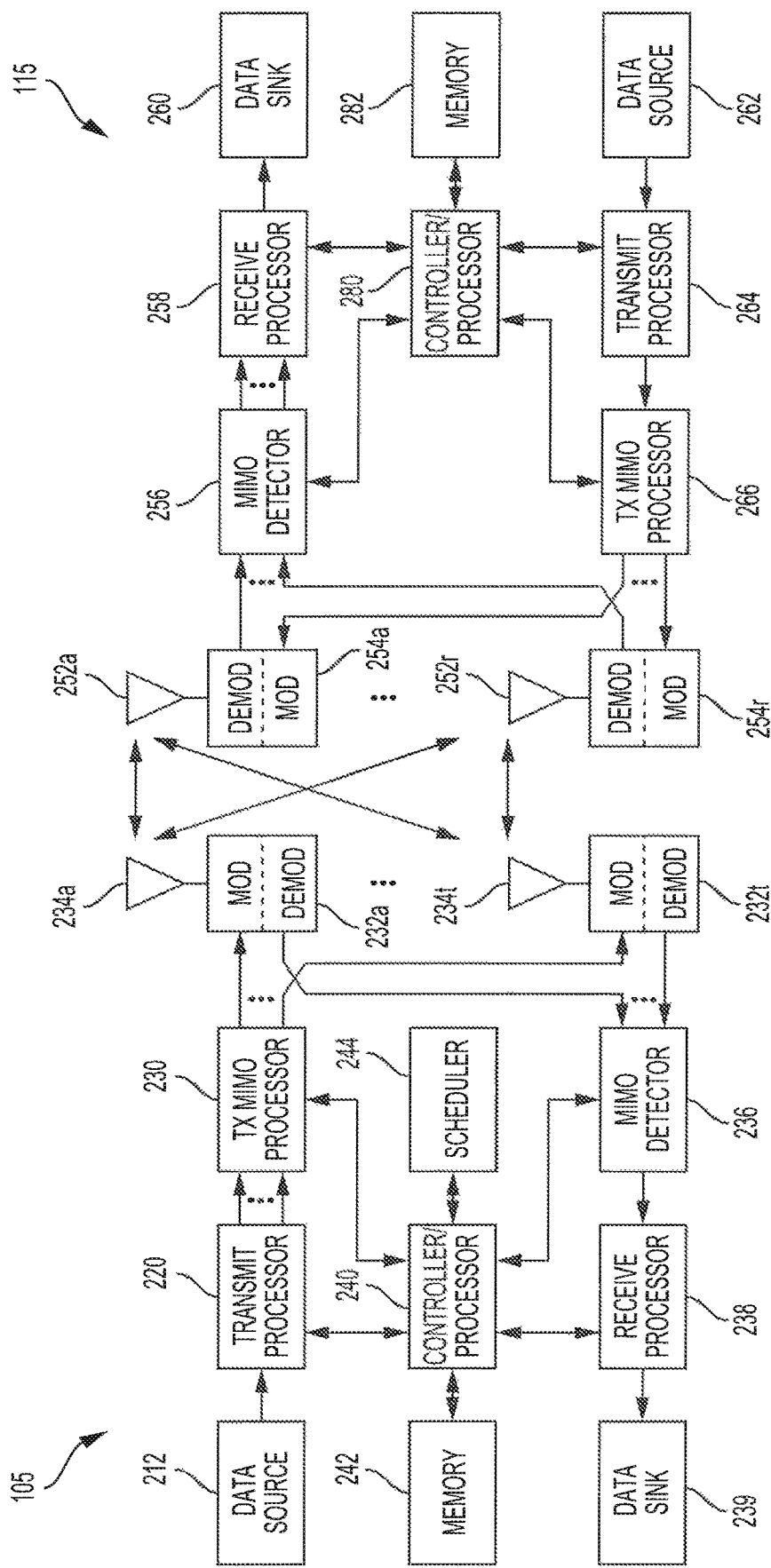
FIG. 2 is a block diagram conceptually illustrating a design of a base station/eNB and a UE configured according to one aspect of the present disclosure.

FIG. 2 shows a block diagram of a design of base station/eNB 105 and UE 115, which may be one of the base stations/eNBs and one of the UEs in FIG. 1. For a restricted association scenario, the eNB 105 may be small cell eNB 105z in FIG. 1, and UE 115 may be UE 115z, which in order to access small cell eNB 105z, would be included in a list of accessible UEs for small cell eNB 105z. eNB 105 may also be a base station of some other type. eNB 105 may be equipped with antennas 234a through 234t, and UE 115 may be equipped with antennas 252a through 252r.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution illustrated in FIGS. 4A-4C, and/or other processes for the techniques described herein. Memories 242 and 282 may store data and program codes for eNB 105 and UE 115, respectively. Scheduler 244 may schedule UEs for data transmission on the downlink and/or uplink.

Various network entities (e.g., any or all of eNBs 105 and UEs 115) of wireless network 100 are adapted according to the concepts herein to provide radio resource management (RRM) to facilitate the co-existence of the neighboring cells. Radio resource management implemented to facilitate the co-existence of neighboring cells according to embodiments manages radio resources with respect to instances of dominant interference for deployments utilizing a same frequency or overlapping frequencies, whether in licensed or unlicensed bands, in proximity. Such instances of dominant interference may, for example, comprise situations in which an interfering network element causes interference sufficient to impinge upon an interfered network element to the point of appreciably degraded communication quality, data throughput, and/or communication link reliability. Instances of dominant interference as may be managed according to some implementations may comprise interference impinging upon an interference network element sufficient to block communications, or some portion thereof.

In operation according to some implementations herein, transmission of discovery signals may be utilized to detect situations of dominant interference, whereby the network elements of the neighboring cells may provide protected resources for each other (e.g., an eNB may utilize information regarding detection of a discovery signal to implement scheduling or other actions to provide protected resources for a neighboring cell associated with the detected discovery signal). Providing protected resources may, for example, comprise managing one or more communication resources to prevent a putative interfering network entity from using the one or more communication resources in a manner (e.g., in a time slot, in a frequency band, in a spatial direction, etc.) that would result in interference impinging upon another network element sufficient to result in an instance of dominant interference. The one or more communications resources thus being protected resources herein.

The protected resources may comprise particular frequencies, time slots, channels, etc. For example, protected resources may comprise blank time resources (e.g., nothing is transmitted by the interfering node during a block of time), blank in frequency resources (e.g., some resource blocks are not utilized), modified power resources (e.g., the transmit power on some resources is reduced compared to what would be otherwise used), and/or spatial control resources (e.g., the beamforming vectors of some resources are controlled such that there is no significant transmission in the direction of the interfered node). In operation according to some implementations, the protected resources may comprise some predetermined or selected portion of the resources provided (e.g., a database identifying the protected resources for all eNBs that are operating on a particular frequency may be provided, such as may be stored in memories of the eNBs, in a centralized server, etc.). It should be appreciated that the protected resources of embodiments may comprise data channels, control channels, etc., as well as portions thereof. For example, various overhead signals, such as may be broadcast periodically by the eNBs, may be protected according to implementations herein, thereby being protected resources.

Discovery signal transmission according to concepts herein enables network elements of a wireless communication system to discover other network elements of the wireless communication system, whether such other network elements are operating with respect to a cell of a same or different operator. For example, using discovery signal transmissions as described herein, even where eNBs are disposed such that eNBs of neighboring cells are unable to detect the transmissions of a neighboring eNB (rendering listen before talk (LBT) techniques ineffective), an eNB serving UEs within one cell is enabled to discover UEs served by neighboring eNBs. Additionally or alternatively, in operation according to implementations herein, UEs served by one eNB may discover UEs served by a neighboring eNB and/or may discover the neighboring eNB. Such UEs may provide measurement and reporting with respect to their discovery of the other UEs and/or eNBs to their serving eNB. Information regarding the discovery of such UEs and/or eNBs may be utilized in accordance with the concepts herein to enable the serving eNB to implement efficient radio resource management, such as to provide protected resources for a neighboring cell associated with the detected discovery signal.

Discovery signals utilized according to implementations according to the concepts herein may comprise various forms of reference signals (e.g., a signal generated based on known data). For example, a discovery signal according to aspects of the present disclosure may comprise a primary synchronization signal (PSS), a secondary synchronization signal (SSS), and/or a sounding reference signal (SRS). Irrespective of the particular form utilized, discovery signals of some implementations herein may comprise one or more specific or predetermined sequences to facilitate detection by the network elements (e.g., eNBs and UEs) of a neighboring cell. For example, sequences are selected for use with respect to discovery signals to facilitate detection by network elements (e.g., UEs and/or eNBs) of neighboring cells.

In accordance with some configurations, the discovery signals utilized with respect to a wireless network may comprise a single sequence or a pool of sequences possibly mapped to a cell or a transmission point identity. For example, all network elements or some portion thereof (e.g., UEs, eNB, or both) of a particular cell may transmit a discovery signal having a same sequence and transmission timing for detection by network elements of one or more neighboring cells. From neighboring cell perspective, a common sequence for all UEs served by a given cell may be sufficient for the neighboring cell to identify situations in which dominant interference may result from transmissions made by the eNB and/or the UEs served by that eNB. Although the use of such a common sequence for the UEs server by a given cell may render discovery by a UE of other UEs within a same cell difficult, such discovery of UEs in the same cell is not utilized in accordance with some implementations as the eNB serving the cell has information regarding each UE it serves. However, in some situations, such as coordinated multipoint (CoMP) scenarios, it may be desirable to configure a dedicated sequence per UE in order to minimize possible downlink-uplink interference. In operation according to some implementations, a deterministic timing relationship may be provided between the discovery signal (e.g., PSS/SSS comprising a discovery signal sequence) transmitted by an eNB and the discovery signal (e.g., SRS comprising a discovery signal sequence) transmitted by the UEs served by the eNB, such as to simplify protection of clear channel assignment (CCA) exempt transmissions. Irrespective of the particular form of the discovery signal, discovery signals of implementations herein are adapted to facilitate network elements of a cell to detect network elements of neighboring cells.

Figure 3A:
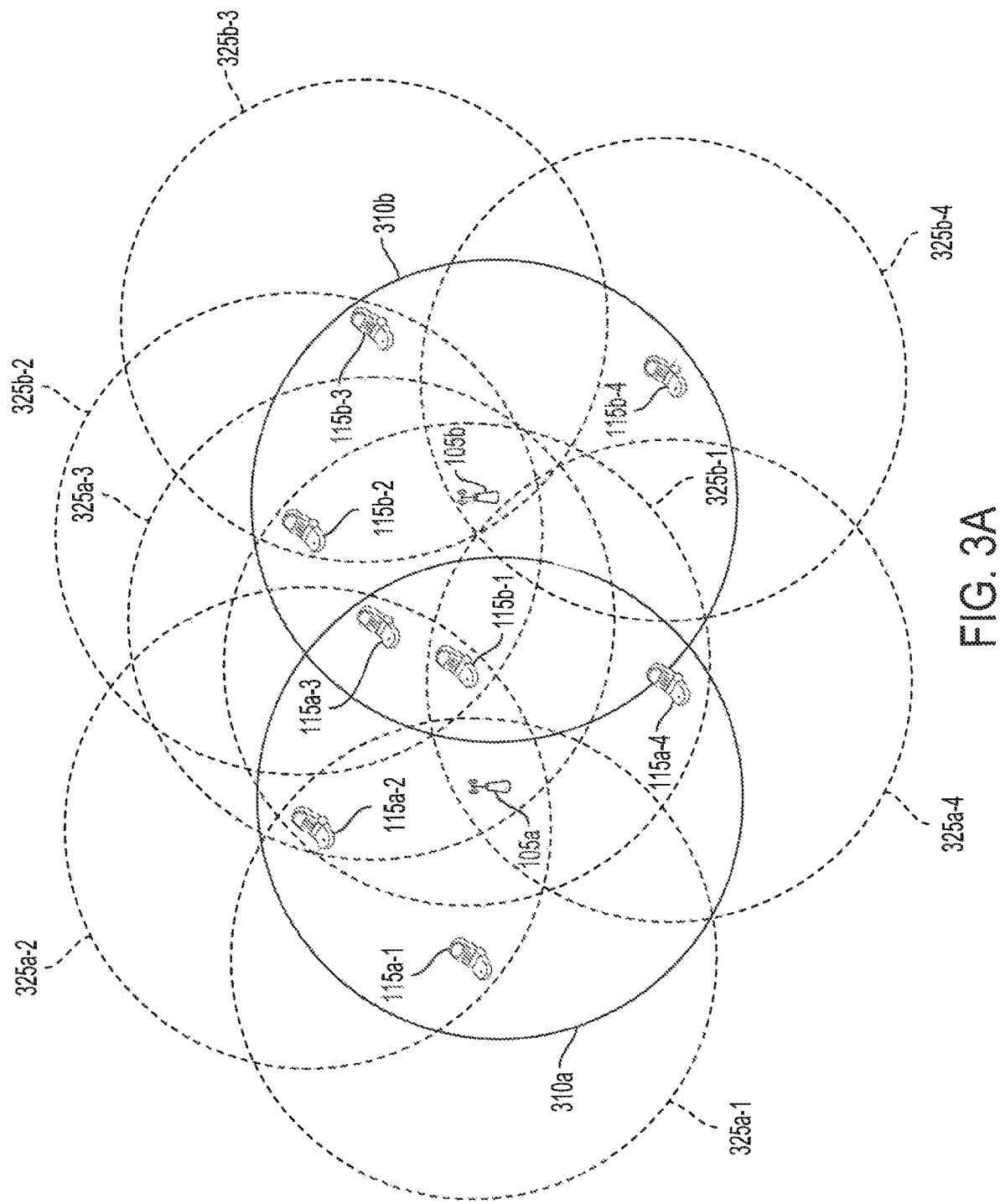
FIGS. 3A-3E are block diagrams illustrating various configurations of portions of a wireless communication system according to aspects of the present disclosure.

FIG. 3A shows a configuration of a portion of wireless network 100 including eNB 105a, serving UEs 115a-1 through 115a-4, and eNB 105b, serving UEs 115b-1 through 115b-4. FIG. 3A illustrates the relationships of the discovery ranges (e.g., discovery ranges 310a and 310b corresponding to eNBs 105a and 105b respectively, discovery ranges 325a-1 through 325a-4 corresponding to UEs 115a-1 through 115a-4 respectively, and discovery ranges 325b-1 through 325b-4 corresponding to UEs 115b-1 through 115b-4 respectively) of the various network elements shown. For example, in the example of FIG. 3A, the area corresponding to discovery range 310a (e.g., as may be coextensive with the area of cell 110a) of eNB 105a does not include eNB 105b and the area corresponding to discovery range 310b (e.g., as may be coextensive with the area of cell 110b) of eNB 105b does not include eNB 105a. Thus, eNBs 105a and 105b may not be able to discover one another. However, UE 115b-1, served by eNB 105b, is disposed in discovery range 310a of eNB 105a and may thus be discovered by eNB 105a using a discovery signal herein. Similarly, UE 115a-3, served by eNB 105a, is disposed in discovery range 310b of eNB 105b and may thus be discovered by eNB 105b using a discovery signal herein. Further, UE 115b-2, served by eNB 115b, is disposed in discovery range 325a-3 of UE 115a-3, served by eNB 115a, and thus may be discovered by UE 115a-3 using a discovery signal herein and reported to eNB 115a in accordance with operation herein. Similarly, UE 115a-2, served by eNB 115a, is disposed in discovery range 325b-1 of UE 115b-1, served by eNB 115b, and thus may be discovered by UE 115b-1 using a discovery signal herein and reported to eNB 115b in accordance with operation herein.

Figure 3B:
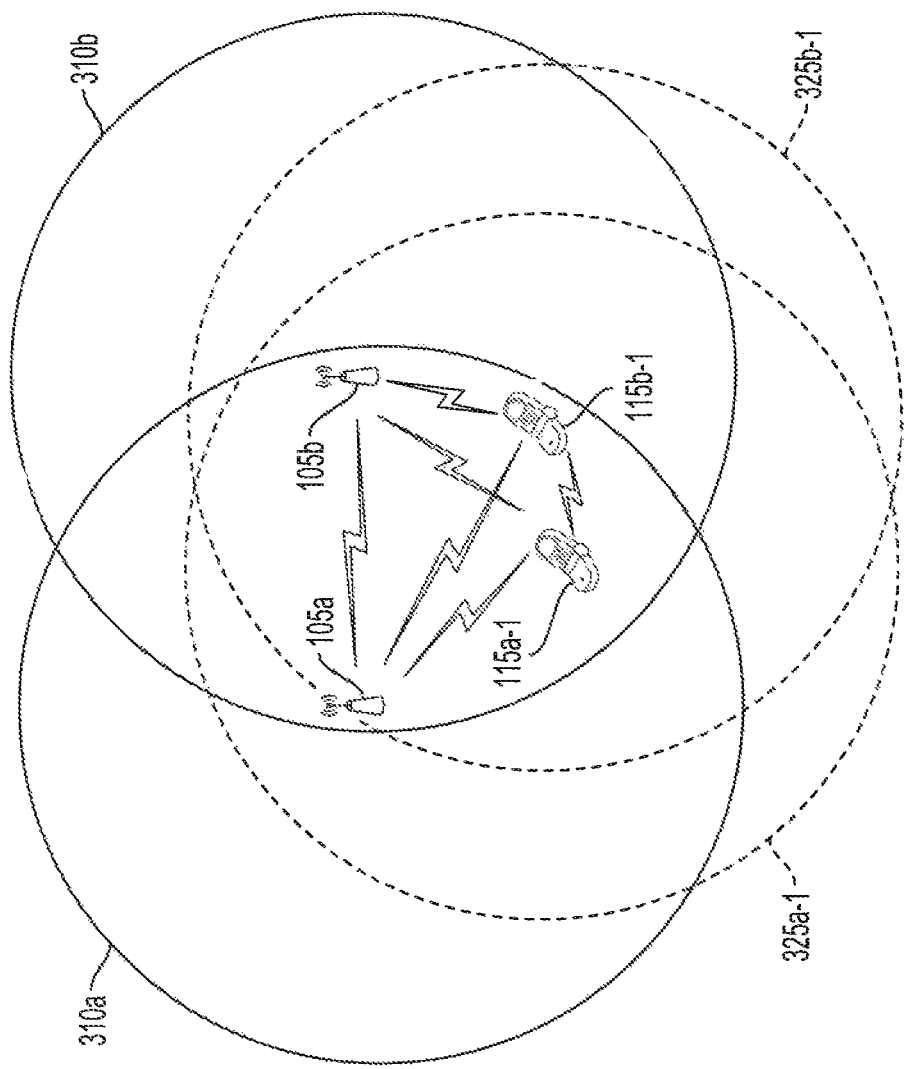
Figure 3C:
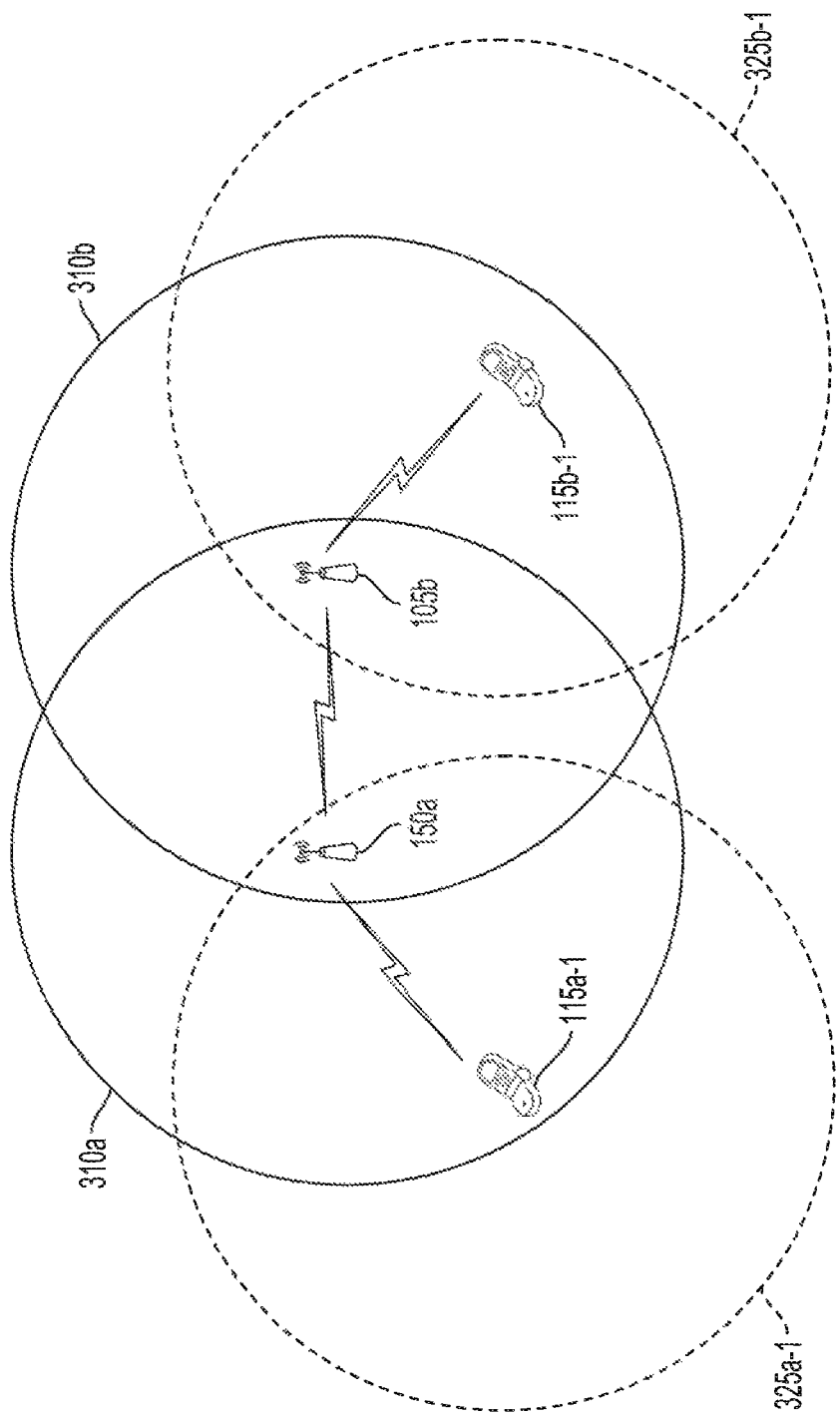
Figure 3D:
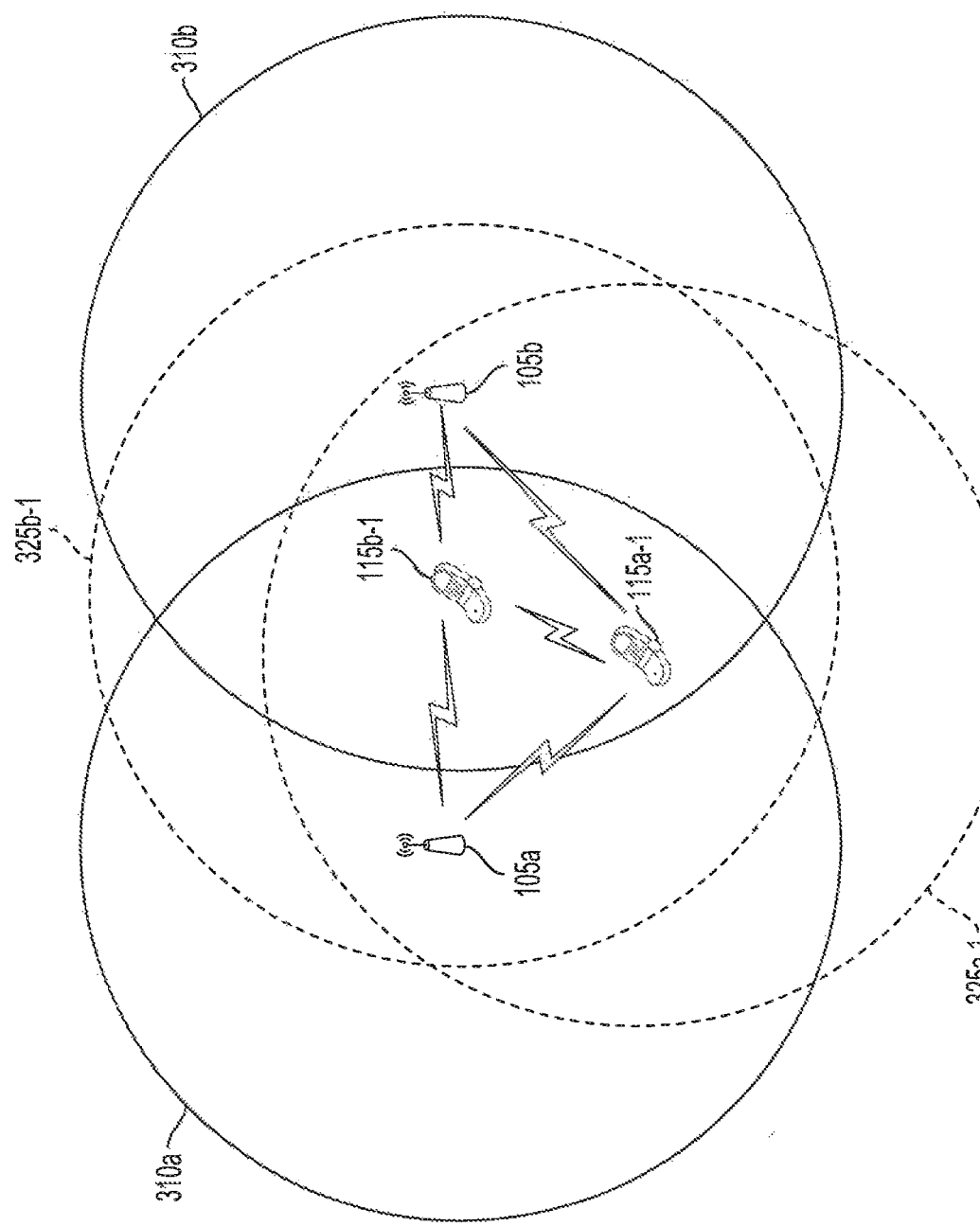
Figure 3E:
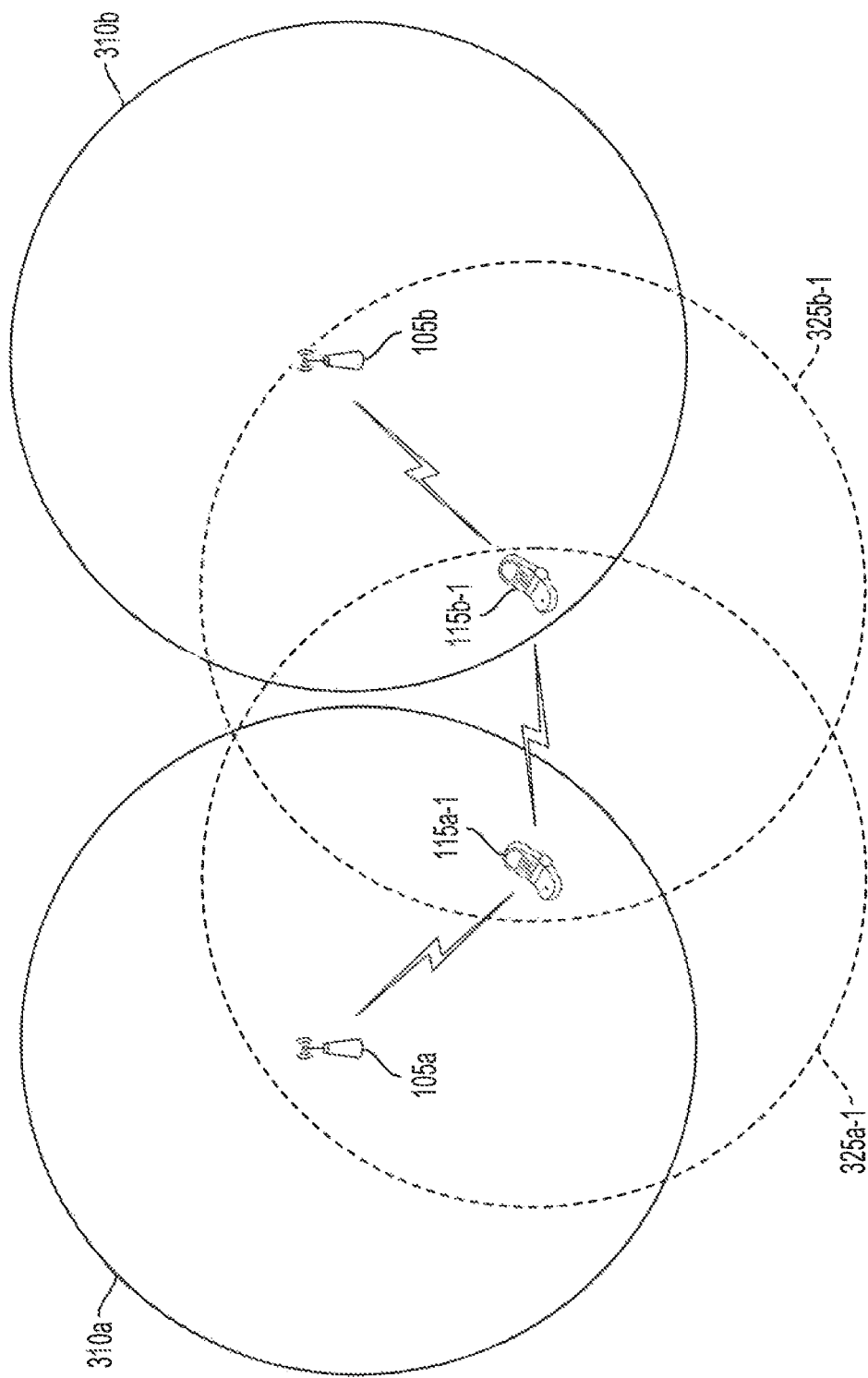

Although FIG. 3A shows a particular configuration of the wireless network in which neighboring base stations are disposed such that these base stations may be unable to detect the transmissions of the neighboring base station, it should be appreciated that the illustrated configuration is but one example of a wireless network configuration in which an implementation in accordance with the concepts herein may be embodied. FIGS. 3B-3E show other exemplary wireless network configurations in which implementations in accordance with the concepts herein may be embodied. For example, FIG. 3B shows a configuration of a portion of wireless network 100 in which eNB 105a, UE 115a-1 served by eNB 105a, eNB 105b, and UE 115b-1 served by eNB 105b are all disposed within the discovery ranges of one another. FIG. 3C shows a configuration of a portion of wireless network 100 in which eNBs 105a and 105b are disposed within the discovery ranges of one another, while UEs 115a-1 and 115b-1 being service by a respective one of the eNBs are not disposed within the discovery ranges of network elements of their neighboring cell. FIG. 3D shows a configuration of a portion of wireless network 100 in which eNBs 105a and 105b are not disposed within the discovery ranges of one another, while UEs 115a-1 and 115b-1 being served by a respective one of the eNBs are disposed within the discovery ranges of network elements of their neighboring cell. FIG. 3E shows a configuration of a portion of wireless network 100 wherein eNBs 105a and 105b are not disposed within the discovery ranges of one another, while UEs 115a-1 and 115b-1 being served by a respective one of the eNBs are disposed within the discovery ranges of a UE of their neighboring cell. Irrespective of the particular configuration in which neighboring base stations are disposed, operation according to concepts herein may provide for the use of discovery signals to discover network elements (e.g., UEs and/or eNBs) of neighboring cells and the use of information regarding such discoveries to implement radio resource management.

In operation according to aspects of the disclosure, an eNB (e.g., eNB 105a and eNB 105b) may configure UEs served by the eNB (e.g., UE 115a-1 for eNB 105a and UE 115b-1 for eNB 105b) for measurement and reporting of discovery signals detected from neighboring eNBs and/or the UEs served by the neighboring eNBs. For example, controller/processor 240 of eNB 105a may control transmission of appropriate control data to UE 115a-1 to configure the UE for the aforementioned measurement and reporting of discovery signals. Controller/processor 280 of UE 115a-1 may thus correspondingly operate to control operation of the UE to monitor for discovery signals and to provide reporting with respect to discovery signals detected by the UE. Accordingly, UE 115a-1 of FIGS. 3B, 3D, and 3E may operate to detect the discovery signal of UE 115b-1 and report to eNB 105a for radio resource management and/or UE 115b-1 of FIGS. 3B, 3D, and 3E may operate to detect the discovery signal of UE 115a-1 and report to eNB 105b for radio resource management. Additionally or alternatively, UE 115a-1 of FIGS. 3B and 3D may operate to detect the discovery signal of eNB 105b and report to eNB 105a for radio resource management and/or UE 115b-1 of FIGS. 3B and 3D may operate to detect the discovery signal of UE 115a-1 and report to eNB 105B for radio resource management. Similarly, an eNB may detect the discovery signal of UEs served by neighboring eNBs and/or the discovery signal of neighboring eNBs. For example, eNB 105a of FIGS. 3B, 3D, and 3E may operate to detect the discovery signal of UE 115b-1 for use in radio resource management and/or eNB 105b of FIGS. 3B, 3D, and 3E may operate to detect the discovery signal of UE 115a-1 for use in radio resource management. Further, eNB 105a of FIGS. 3A and 3B may operate to detect the discovery signal of eNB 105b for use in radio resource management and/or eNB 105b of FIGS. 3A and 3B may operate to detect the discovery signal of eNB 105a for use in radio resource management. Implementations may be adapted to perform radio resource management procedures rapidly in response to detecting discovery signals in order for the network to quickly adapt to newly discovered network elements.

In implementations where the discovery signal occasion is flexible, eNBs may operate to learn discovery signal configurations of neighboring cells to facilitate detecting the discovery signals (e.g., to configure UEs served by the eNB to monitor for discovery signals at appropriate times, using appropriate frequencies, etc.). For example, an eNB may operate to detect neighboring eNB system information directly (e.g., where the eNBs are disposed such that the neighboring eNBs are able to detect the transmissions of their neighboring eNBs) or indirectly (e.g., from information reported by UEs served by the eNB). In operation according to some implementations, UEs served by a first eNB (e.g., UE 115a-1 served by eNB 105a) may obtain information regarding a neighboring eNB (e.g., eNB 105b) by directly reading the neighboring eNB system information or from UEs (e.g., UE 115b-1 served by eNB 105b) in its proximity served by the neighboring eNB. In operation according to some implementations, one or more database (e.g., as may be stored by the serving and/or neighboring eNB, such as within memories 242 thereof, and/or as may be stored by a central database in communication with the eNBs) may be utilized to determine neighboring eNB system information (e.g., wireless communication scheduling and/or timing information, eNB location information, protected resources, configurations for protecting resources, etc.). For example, the particular sequence provided as a discovery signal and/or other discovery signal identity information may be utilized to access system information particular to the neighboring eNB.

Various information derived from or associated with the discovery signals as detected by one or more network elements may be utilized in providing radio resource management herein. Accordingly, the UEs may be configured detect discovery signals and report various information regarding the detected discovery signal, such as discovery signal identity, signal strength, timing offsets for the discovery signal, PSS/SSS/SRS, etc., to their serving eNB for use in radio resource management. The eNBs may additionally or alternatively be configured to detect discovery signals and obtain information, such as the aforementioned discovery signal identity, signal strength, timing offsets for the discovery signal, PSS/SSS/SRS, etc., regarding the discovery signal for use in radio resource management. In operation according to some implementations, logic of controller/processor 240 of the eNB may analyze information obtained from or in association with detected discovery signals for implementing radio resource management. For example, information regarding discovery signal identity may be utilized to determine the location of the neighboring base station, the particular resources to be provide protection by the radio resource management, etc. Information regarding the signal strength of the discovery signal may be utilized to identify instances of dominant interference (e.g., to determine whether or not to implement radio resource management with respect to detecting an instance of a discovery signal), to determine the location of the network element transmitting the discovery signal, etc. Information regarding timing offset may be utilized for implementing various radio resource management techniques (e.g., scheduling transmission on a shared frequency to avoid interference) in scenarios where neighboring base stations are not synchronized, where neighboring base station clear channel assessment (CCA) exempt transmission occasions are not already protected, etc. Information regarding PSS and/or SSS may be utilized to synchronize scheduling of protected resources for avoiding interference, for determining an identity of the base station or wireless network the neighboring cell is associated with, etc.

The various wireless network configurations of FIGS. 3B-3E illustrate particular dominant interference scenarios in which such radio resource management may be implemented according to the concepts herein. For example, in the wireless network configuration of FIG. 3B, wherein neighboring eNBs 105a and 105b can discover each other, a LBT radio resource management procedure may be implemented by either or both eNB due to instances of strong interference. In the wireless network configuration of FIG. 3C, wherein neighboring eNBs 105a and 105b can discover each other but UEs 115a and 115b served by the neighboring eNBs are outside of the discovery ranges of the neighboring network elements a radio resource management procedure in which a reuse pattern of 1 (i.e., the resource is reused simultaneously in an adjacent cell) may be utilized with respect to protected resources (e.g., using directional beams at the eNBs to avoid interference at the neighboring eNB). In the wireless network configuration of FIG. 3D, wherein neighboring eNBs 105a and 105b cannot discover each other but can discover a neighboring one of UEs 115b and 115a served by the neighboring eNB, detection of the discovery signal of the neighboring UE may be used to identify dominant interferers (e.g., UE to UE, UE to neighboring eNB, and/or eNB to neighboring UE) and protected resources provisioned accordingly. In the wireless network configuration of FIG. 3E, wherein neighboring eNBs 105a and 105b cannot discover each or the UEs served by their neighboring eNB but UEs 115a and 115b can discover the neighboring UE, detection of the discovery signal of the neighboring UE may be used to identify dominant interferers (e.g., UE to UE) and protected resources provisioned accordingly.

The aforementioned provisioning of protected resources may comprise the serving eNB configuring communication operations within the serving eNB's cell to facilitate the neighboring eNB serving the neighboring UEs on the downlink and/or to facilitate the neighboring UEs communicating with the neighboring eNB on the uplink (e.g., not scheduling transmission within the serving eNB's cell for some portion of the shared resources, using beam forming and/or other spatial techniques for isolating transmissions from neighboring network elements, etc.). In operation according to some implementations, the neighboring eNB similarly operates to provision protected resources for facilitating communications in the foregoing serving cell.

Figure 4A:
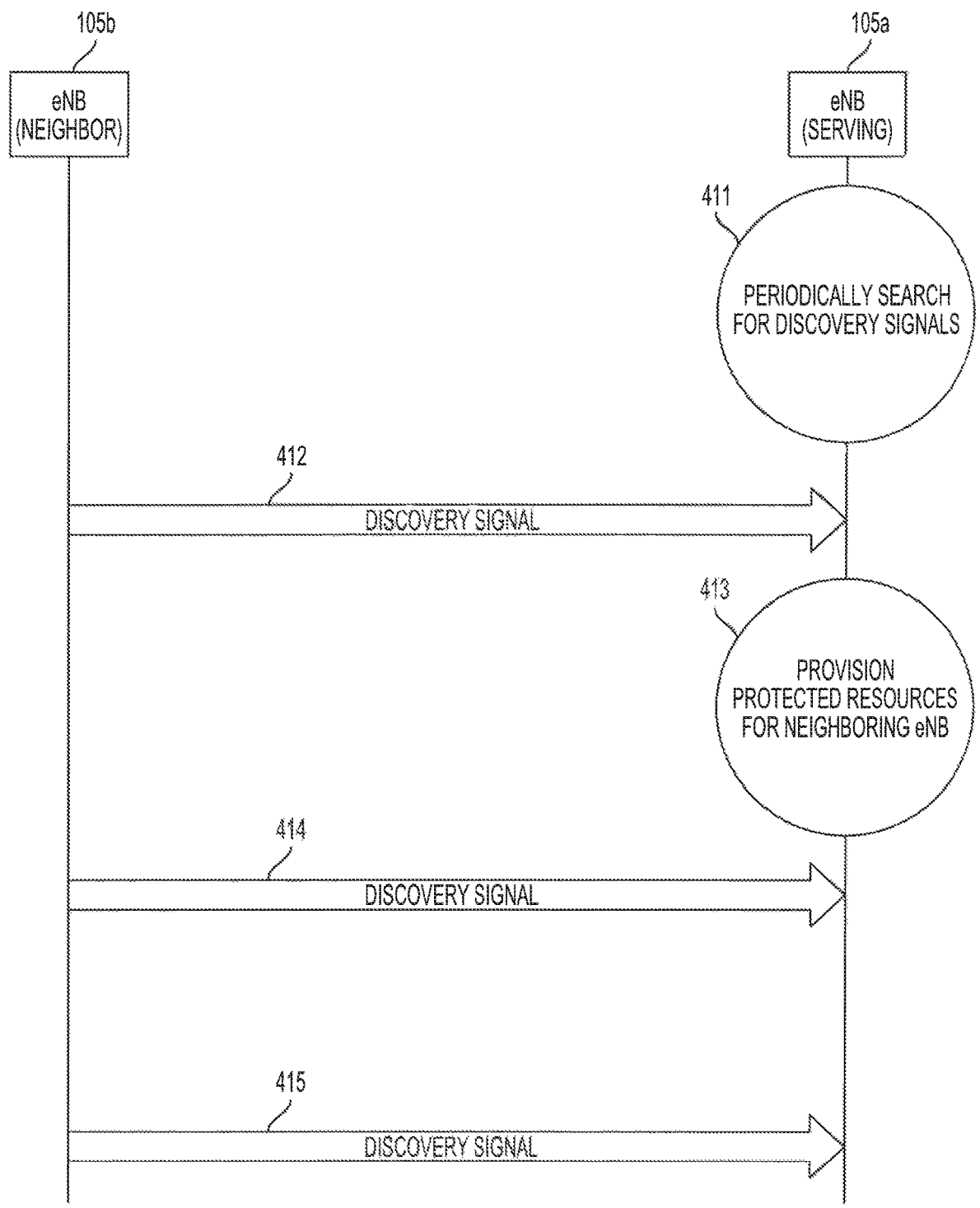
FIGS. 4A-4C are diagrams illustrating operation according to exemplary implementations corresponding to various configurations of a wireless communication system according to aspects of the present disclosure.

FIG. 4A illustrates operation according to an exemplary implementation in a configuration such as may correspond to that of FIGS. 3B and 3C wherein eNB 105a and eNB 105b are disposed within the discovery ranges of one another. In operation according to the illustrated example, eNB 105a may provision certain resources (e.g., frequencies, time slots, etc.) designated as protected resources for avoiding dominant interference from transmissions by eNB 105a and/or UEs served by eNB 105a for any previously detected or otherwise known neighboring network elements and initiates monitoring (e.g., periodic monitoring, random monitoring, etc.) for discovery signals associated with neighboring cells (reference 411). Thereafter, an instance of a discovery signal transmitted by neighboring eNB 105b may be detected by eNB 105a (reference 412). Having detected the discovery signal, eNB 105a is aware of neighboring eNB 105b and thus may implement radio resource management to avoid situations of dominant interference to eNB 105b and/or UEs served by eNB 105b resulting from transmissions by eNB 105a and/or UEs served by eNB 105a. For example, eNB 105a may provision certain resources (e.g., frequencies, time slots, etc.) designated as protected resources for avoiding dominant interference from transmissions by eNB 105a and/or UEs served by eNB 105a based upon information obtained from or in association with the detected discovery signal (reference 413). Thereafter, communication with respect to the protected resources by the network elements of the cell may be performed in accordance with the radio resource management by eNB 105a to protect communications of the network elements of the neighboring cell. In operation according to some implementations, eNB 105a may continue to monitor for discovery signals (references 414 and 415), such as to determine if provisioning of protected resources is to be changed or updated in light of changes detected with respect to monitored discovery signals, to determine if protection of resources is no longer necessary to protect communications of a neighboring cell, etc.

Figure 4B:
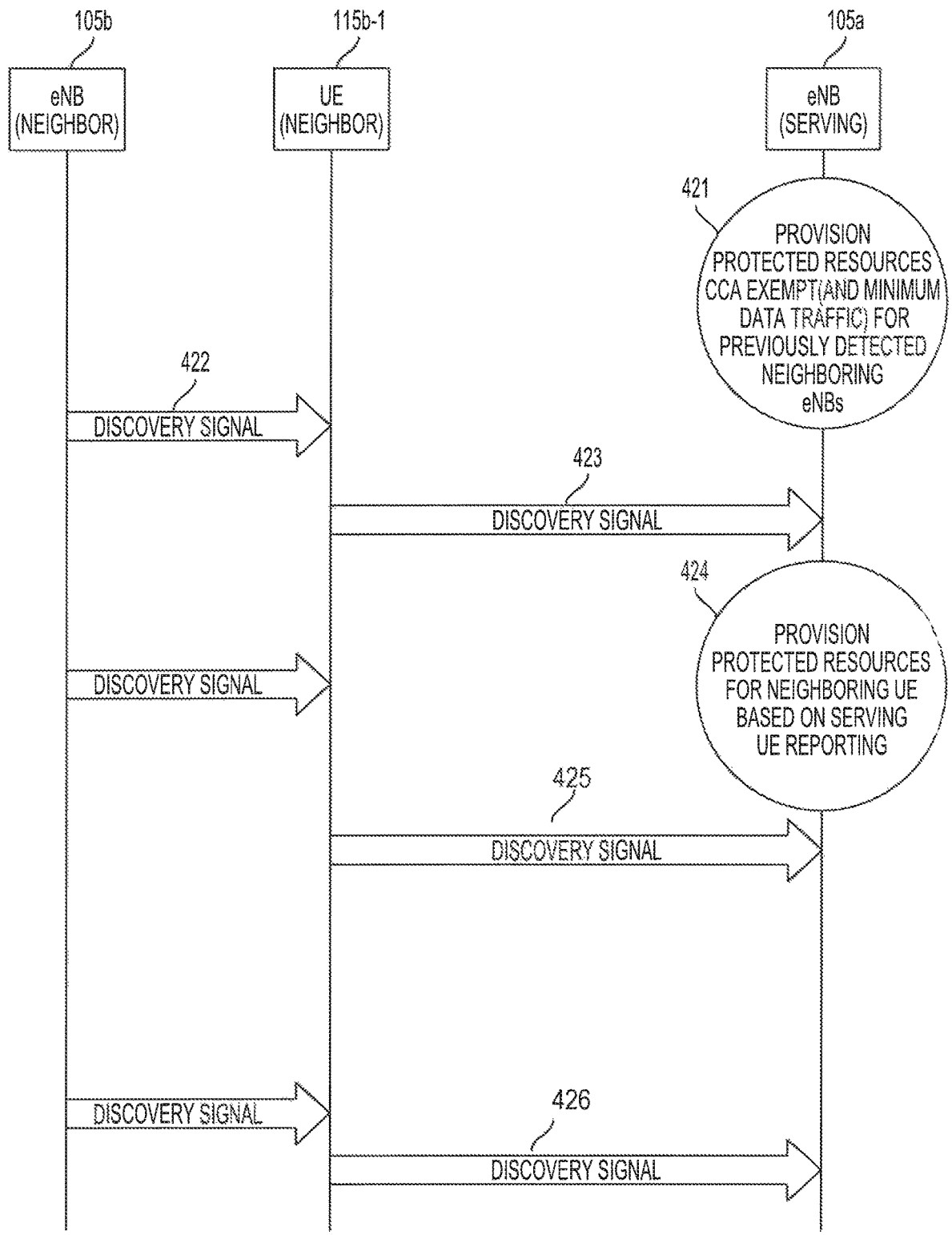

FIG. 4B illustrates operation according to an exemplary implementation in a configuration such as may correspond to that of FIGS. 3B and 3D wherein eNB 105a and eNB 105b may or may not be disposed within the discovery ranges of one another, but where UE 115b-1 being served by neighboring eNB 105b is disposed within the discovery range of eNB 105a. In operation according to the illustrated example, eNB 105a may provision certain resources (e.g., frequencies, time slots, etc.) designated as protected resources for avoiding dominant interference from transmissions by eNB 105a and/or UEs served by eNB 105a for any previously detected or otherwise known neighboring network elements and initiates monitoring (e.g., periodic monitoring, random monitoring, etc.) for discovery signals associated with neighboring cells (reference 421). In the illustrated example, neighboring eNB 105b transmits an instance of a discovery signal (reference 422) followed by UE 115b-1 served by eNB 105b transmitting an instance of a discovery signal (reference 423). It should be appreciated that although the illustrated example shows a configuration in which the discovery signal transmission by UE 115b-1 has a deterministic timing relationship between the discovery signal transmitted by eNB 105*b* and the discovery signal transmitted by the UE 115*b*-1, implementations in accordance with the concepts herein are not limited to such a deterministic relationship. The instance of the discovery signal transmitted by UE 115*b*-1 served by neighboring eNB 105*b* may be detected by eNB 105*a* (reference 423). Having detected the discovery signal, eNB 105*a* is aware of UE 115*b*-1 and correspondingly neighboring eNB 105*b* and thus may implement radio resource management to avoid situations of dominant interference to eNB 105*b* and/or UEs served by eNB 105*b* resulting from transmissions by eNB 105*a* and/or UEs served by eNB 105*a*. For example, as in the example of FIG. 4A, eNB 105*a* may provision certain resources (e.g., frequencies, time slots, etc.) designated as protected resources for avoiding dominant interference from transmissions by eNB 105*a* and/or UEs served by eNB 105*a* based upon information obtained from or in association with the detected discovery signal (reference 424). Thereafter, communication with respect to the protected resources by the network elements of the cell may be performed in accordance with the radio resource management by eNB 105*a* to protect communications of the network elements of the neighboring cell. In operation according to some implementations, eNB 105*a* may continue to monitor for discovery signals (references 425 and 426), such as to determine if provisioning of protected resources is to be changed or updated in light of changes detected with respect to monitored discovery signals, to determine if protection of resources is no longer necessary to protect communications of a neighboring cell, etc.

Figure 4C:
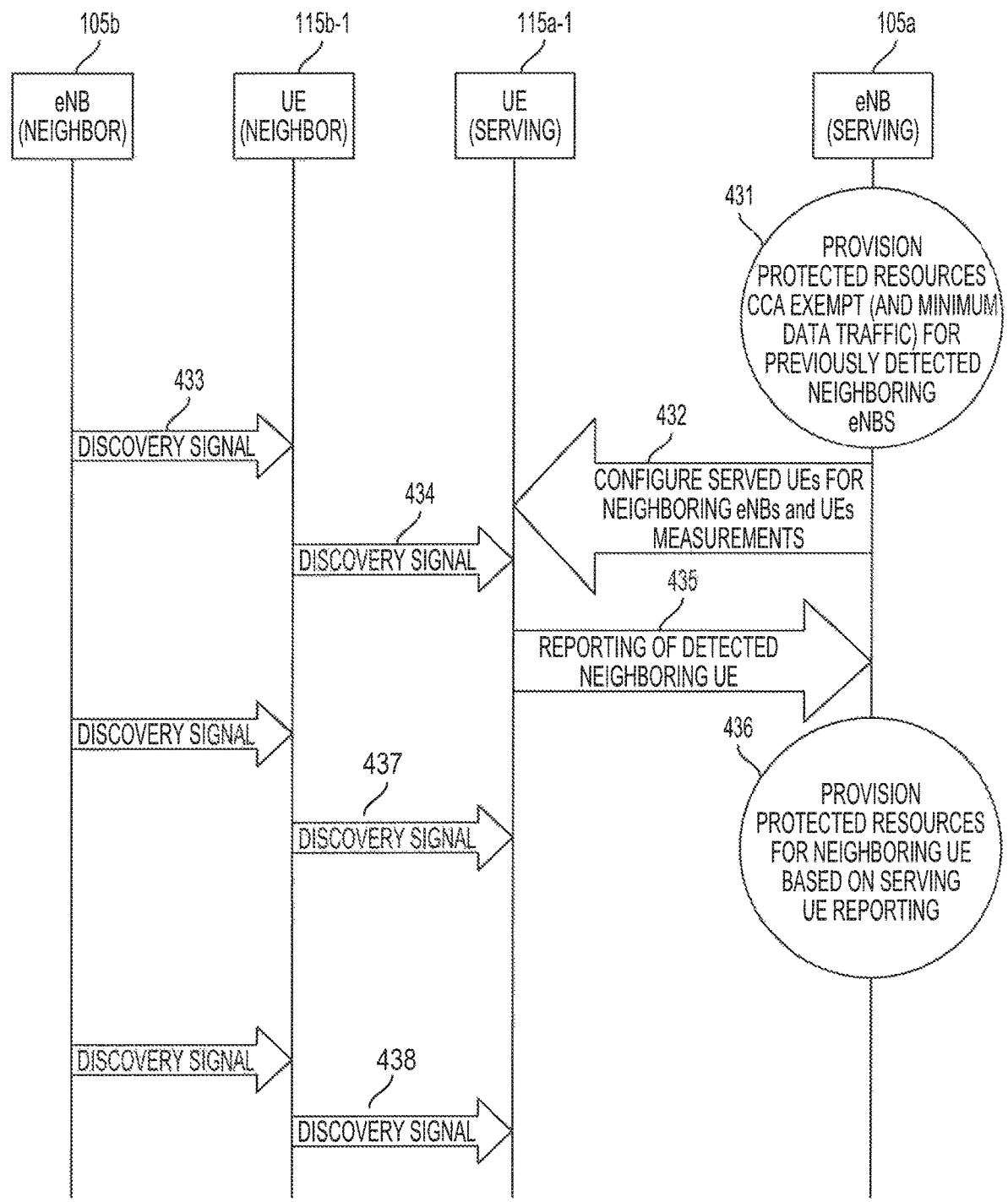

FIG. 4C illustrates operation according to an exemplary implementation in a configuration such as may correspond to that of FIGS. 3B, 3D, and 3E wherein eNB 105*a* and eNB 105*b* may or may not be disposed within the discovery ranges of one another, but where UE 115*b*-1 being served by neighboring eNB 105*b* is disposed within the discovery range of UE 115*a*-1 being served by eNB 105*a*. In operation according to the illustrated example, eNB 105*a* may provision certain resources (e.g., frequencies, time slots, etc.) designated as protected resources for avoiding dominant interference from transmissions by eNB 105*a* and/or UEs served by eNB 105*a* for any previously detected or otherwise known neighboring network elements and initiates monitoring (e.g., periodic monitoring, random monitoring, etc.) for discovery signals associated with neighboring cells (reference 431). Additionally or alternatively, eNB 105*a* of the illustrated implementation configures UEs (e.g., UE 115*a*-1) served by the eNB for measurement and reporting of discovery signals detected from neighboring eNBs and/or the UEs served by the neighboring eNBs (reference 432). In the illustrated example, neighboring eNB 105*b* transmits an instance of a discovery signal (reference 433) followed by UE 115*b*-1 served by eNB 105*b* transmitting an instance of a discovery signal (reference 434). As in the example of FIG. 4B, although the illustrated example shows a configuration in which the discovery signal transmission by UE 115*b*-1 has a deterministic timing relationship between the discovery signal transmitted by eNB 105*b* and the discovery signal transmitted by the UE 115*b*-1, it should be appreciated that implementations in accordance with the concepts herein are not limited to such a deterministic relationship. The instance of the discovery signal transmitted by UE 115*b*-1 served by neighboring eNB 105*b* may be detected by UE 115*a*-1 served by eNB 105*a* (reference 434). Thereafter, UE 115*a*-1 may report detecting the discovery signal to eNB 105*a* (reference 435), possibly providing information such as discovery signal identity, signal strength, timing offsets for the discovery signal, PSS/SSS, etc. Having received report of detection of the discovery signal, eNB 105*a* is aware of UE 115*b*-1 and correspondingly neighboring eNB 105*b* and thus may implement radio resource management to avoid situations of dominant interference to eNB 105*b* and/or UEs served by eNB 105*b* resulting from transmissions by eNB 105*a* and/or UEs served by eNB 105*a*. For example, as in the examples of FIGS. 4A and 4B, eNB 105*a* may provision certain resources (e.g., frequencies, time slots, etc.) designated as protected resources for avoiding dominant interference from transmissions by eNB 105*a* and/or UEs served by eNB 105*a* based upon information obtained from or in association with the detected discovery signal (reference 436). Thereafter, communication with respect to the protected resources by the network elements of the cell may be performed in accordance with the radio resource management by eNB 105*a* to protect communications of the network elements of the neighboring cell. In operation according to some implementations, UE 115*a*-1 may continue to monitor for discovery signals (references 437 and 438) and report detection of discovery signals (not shown) to eNB 105*a*, such as to facilitate eNB 105*a* determining if provisioning of protected resources is to be changed or updated in light of changes detected with respect to monitored discovery signals, determining if protection of resources is no longer necessary to protect communications of a neighboring cell, etc.

It should be appreciated that, although the exemplary operation illustrated in FIGS. 4A-4C is shown with respect to eNB 105*a* discovering neighboring network elements, such operation may be performed by any or all of the neighboring eNBs. For example, eNB 105*b* and the UEs served by eNB 105*b* may operate as described above with respect to eNB 105*a* and the UEs served by eNB 105*a* to discover neighboring network elements (e.g., eNB 105*a* and/or UE 115*a*-1).

Monitoring for discovery signals, such as described above with respect to FIGS. 4A-4C, may be performed at random or periodic intervals, such as during times in which communication transmissions between an eNB and its served UEs are not being performed, at times of communication inactivity designated for monitoring discovery signals, etc. In synchronous deployments, such as where communication transmissions in neighboring cells are synchronized or otherwise coordinated, UEs may operate to measure and report the discovery signals without service interruption (e.g., transmission of discovery signals may be synchronized with respect to the communication transmissions of neighboring cells to enable the UEs to monitor for and report detection of discovery signals without interfering with wireless communications between the UEs and their serving eNB). In asynchronous deployments, such as where communication transmissions in neighboring cells are not synchronized or otherwise coordinated, UEs may be provided with one or more gaps in the communication transmissions in order to facilitate monitoring to detect discovery signals. The gap may, for example, be initially configured randomly and thereafter the periodicity and/or duration adjusted, such as to facilitate UEs detecting the presence of neighboring cell network elements' discovery signal over time. Discovery signal gaps as utilized herein may be optimized based upon the timing of a detected instance of a discovery signal if the neighboring eNB timing is known. Additionally or alternatively, previous measurements can be used to minimize gap length.

Figure 5A:
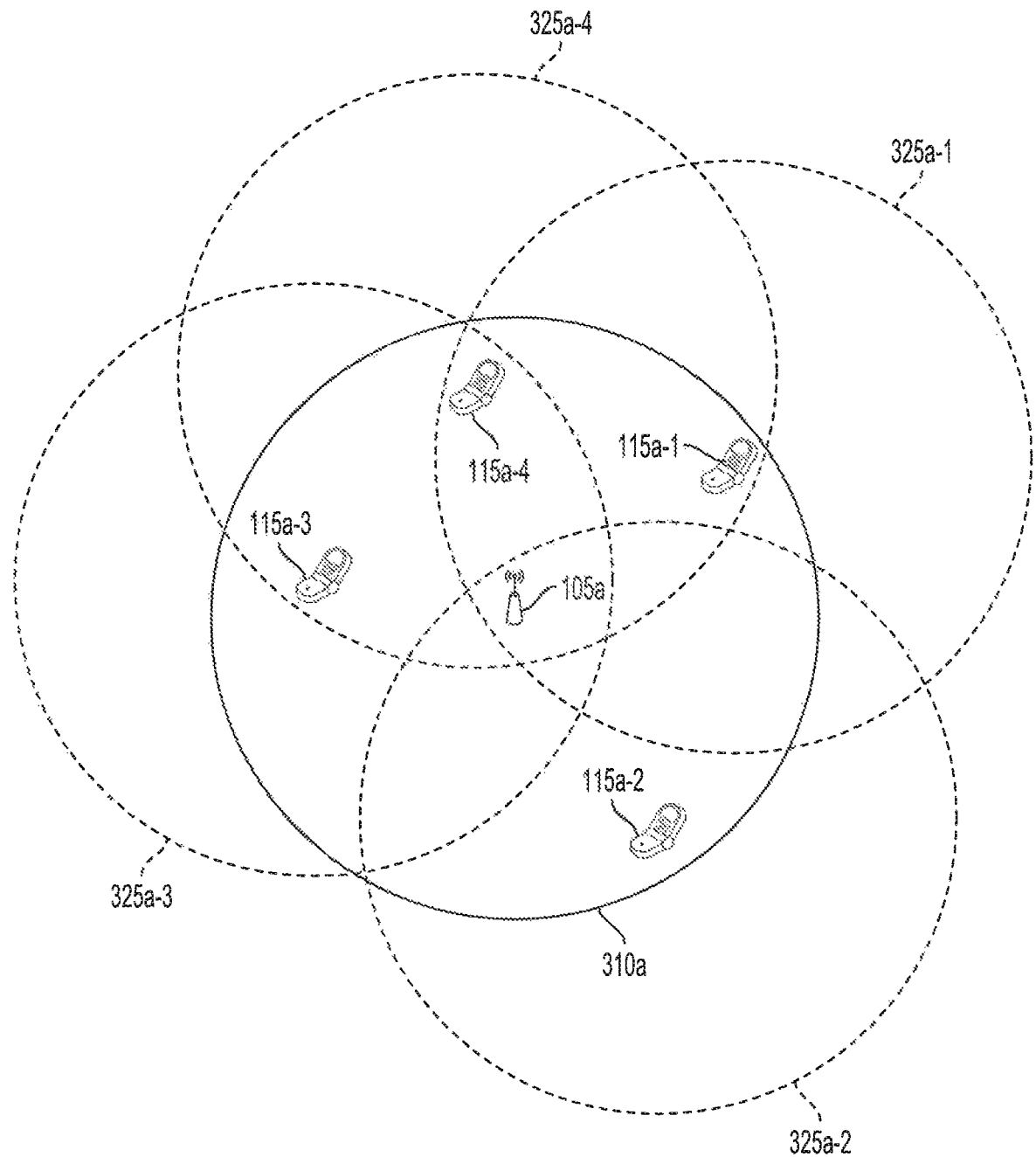
FIGS. 5A and 5B are block diagrams illustrating transmission of discovery signals by various network elements according to aspects of the present disclosure.
Figure 5B:
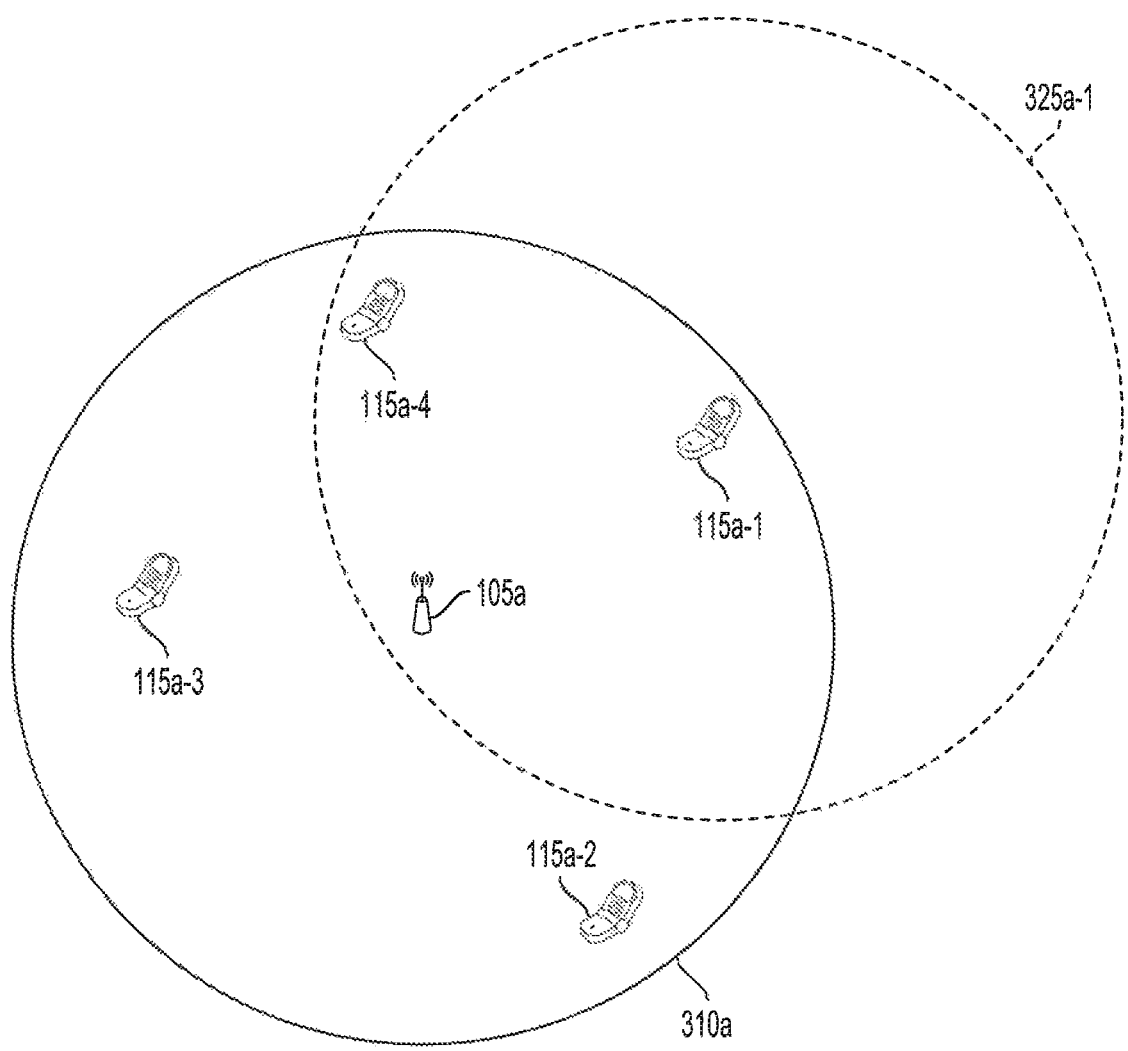

In operation according to some implementations, transmission of discovery signals herein may not be performed by all network elements, or not performed by all network elements all of the time. For example, discovery signals may be transmitted only by eNBs actively serving UEs and/or by UEs transmitting and receiving data by the eNB. In accordance with an exemplary implementation, UEs (e.g., UEs 115a-1 through 115a-4 in the example of FIG. 5A and UE 115a-1 in the example of FIG. 5B) in a radio resource control (RRC) connected state that are not in extended discontinuous reception (DRX) modes may operate to transmit a discovery signal herein, whereas UEs (e.g., UEs 115a-2 through 115a-4 in the example of FIG. 5B) may not transmit a discovery signal when in a RRC idle state or an extended DRX mode.

In operation of exemplary implementations herein, an eNB utilizes information obtained from or in association with detected discovery signals for implementing radio resource management. If the neighboring eNBs belong to the same operator (e.g., there is coordination of scheduling between the eNBs) or otherwise operate cooperatively, joint scheduling may be implemented by the neighboring eNBs (e.g., without adaptive partitioning) to optimize system performance, for example. If the neighboring eNBs do not belong to the same operator or (e.g., there is no coordination of scheduling between the eNBs) do not otherwise operate cooperatively, either or all of the neighboring eNBs may operate to configure protected resources. For example, eNB having detected a neighboring eNB may independently operate to configure protected resources to avoid dominant interference with respect to the neighboring cell associated with the detected discovery signal.

Provisioning or configuration of protected resources may comprise one or more actions of various actions, such as scheduling transmission on a shared frequency to avoid interference, directing transmission on a shared frequency away from the neighboring cell and/or network elements thereof, not scheduling transmission on a shared frequency, muting or reducing transmission power with respect to a protected resource from the interfering node, etc. Such provisioning of protected resources may comprise implicit configuration and/or explicit configuration. In operation according to some implementations herein, provisioning of protected resources may be implemented only upon detection of dominant interferers, wherein if a power difference between the desired signal and the interferer is relatively small, frequency domain partition may suffice, and if a power difference between the desired signal and the interferer is large, time domain partition may be utilized. In accordance with an exemplary implementation, if an eNB determines that it is a dominant interferer, the eNB may operate to implement implicit configuration of the protected resources (e.g., the protected resources to be provisioned and/or the particular configuration of the provisioning may be determined based on discovery signal location of the UE or eNB) and/or to implement explicit configuration of the protected resources (e.g., the protected resources to be provisioned and/or the particular configuration of the provisioning may be signaled, such as by broadcasting, in eNB to neighboring UE communications). As a further example, if an eNB determines that the one or more of the UEs that it serves is a dominant interferer, the eNB may operate to provision for protected resources and not schedule the one or more UEs on those resources using implicit configuration of the protected resources (e.g., the protected resources to be provisioned and/or the particular configuration of the provisioning may be determined based on the discovery signal location of the UE or eNB) and/or explicit configuration of the protected resources (e.g., the protected resources to be provisioned and/or the particular configuration of the provisioning may be signaled to the interfered UE through the serving interfering UE using eNB to serving UE to neighboring UE communications). Additionally or alternatively, if the eNB determines that it is a dominant interferer, the eNB may operate to implement explicit configuration of the protected. Explicit configuration as may be implemented according to concepts herein may be configured with a network server. For example, eNBs may store information regarding location of protected resources (e.g., information for semi-static configuration of protected resources) on a network server, whereby an eNB operating according to the concepts herein may query the network server for the location of protected resources after detecting presence of another eNB or the UE served by that eNB. The explicit configuration of the network resources may additionally or alternatively include direct communication between the eNBs, including eNBs that are associated with the same or different operators.

Figure 6A:
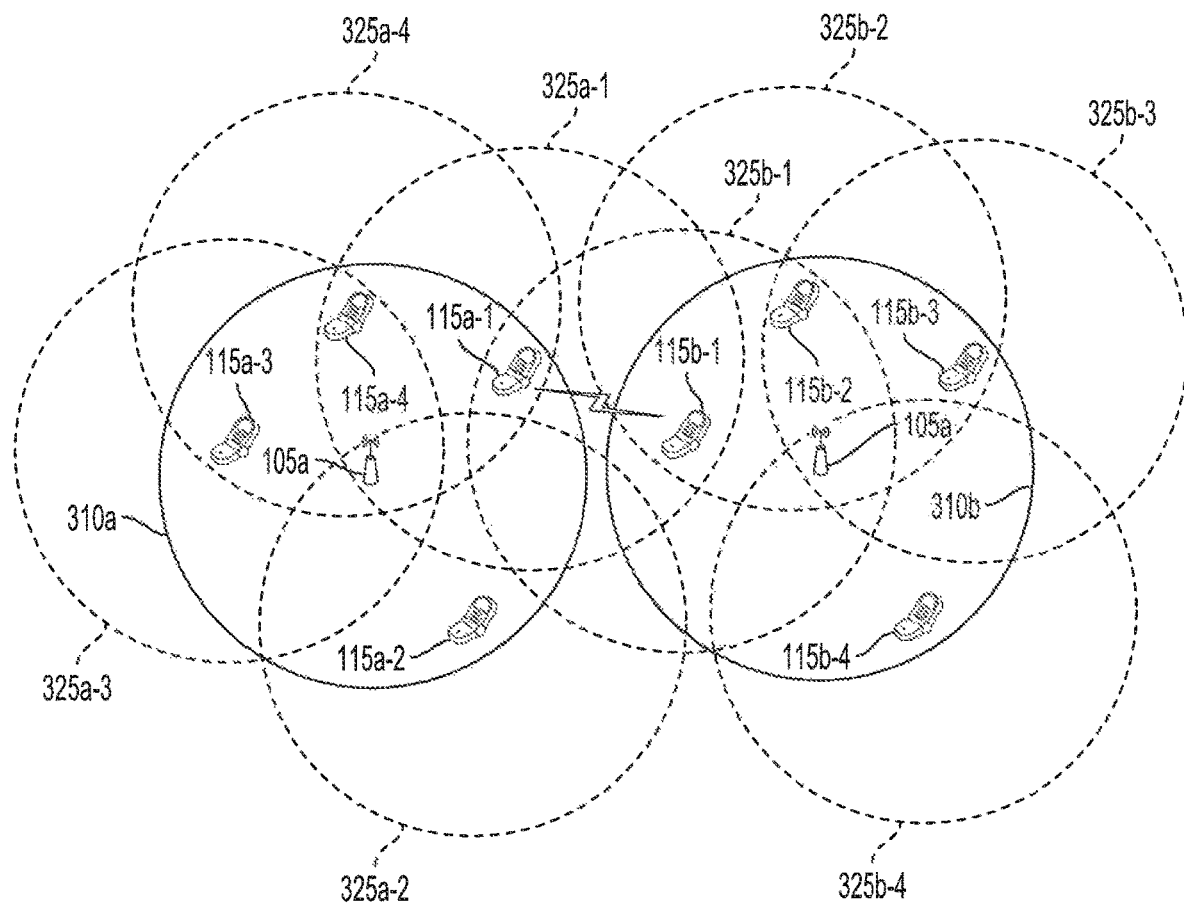
FIGS. 6A and 6B are block diagrams illustrating use of provisioned protected resources provided by radio resource management according to aspects of the present disclosure.
Figure 6B:
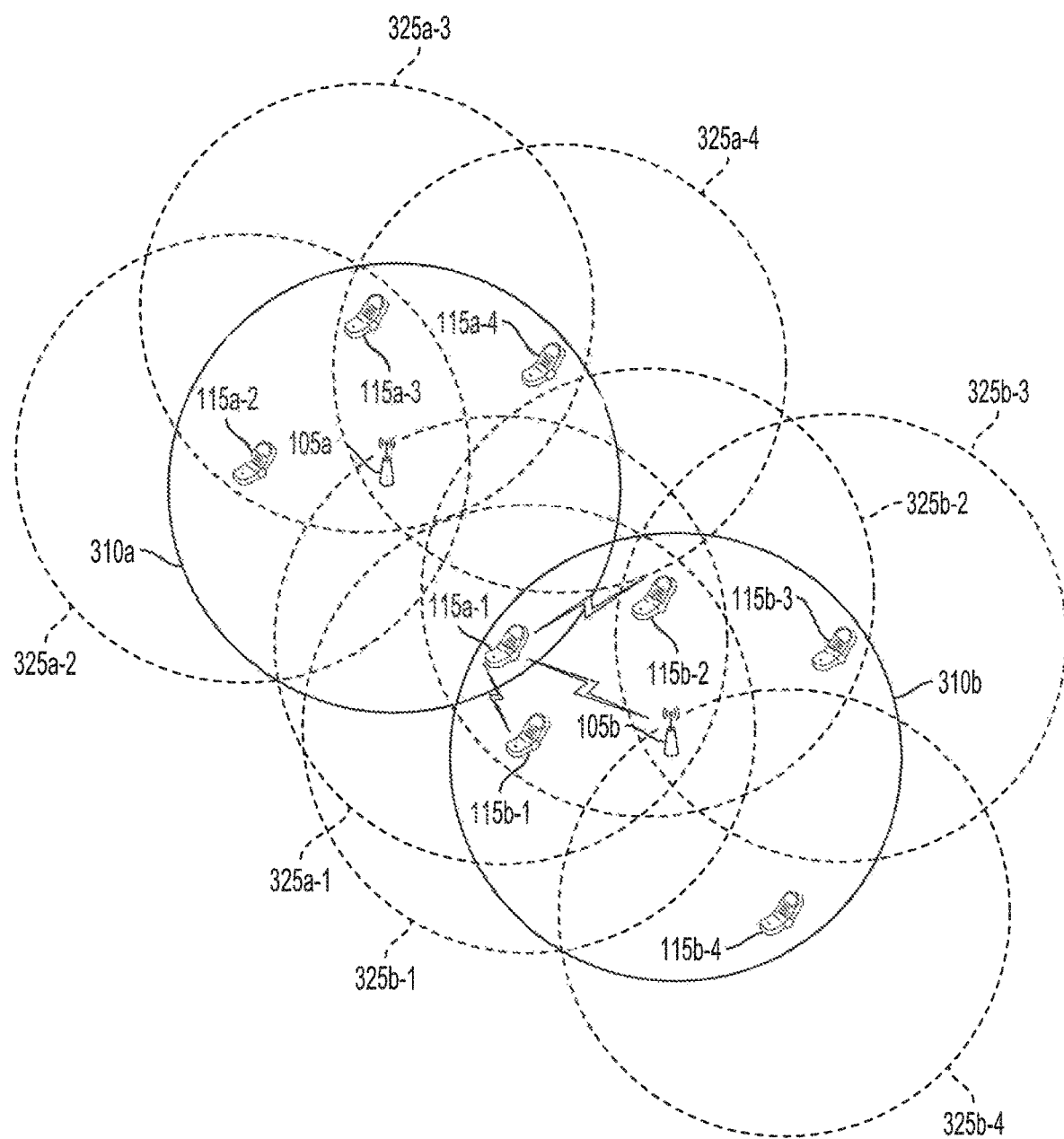

Having described various exemplary implementations according to the concepts herein above, FIGS. 6A and 6B illustrate examples of the use of provisioned protected resources provided by radio resource management based upon detected discovery signals. In particular, the example of FIG. 6A illustrates use of provisioned protected resources provided by radio resource management based upon detected discovery signals for a UE to UE interference scenario. The example of FIG. 6B illustrates use of provisioned protected resources provided by radio resource management based upon detected discovery signals for a UE to UE and eNB to UE interference scenario.

In the example illustrated in FIG. 6A, UE to UE interference is detected by UE 115a-1 detecting the discovery signal of UE 115b-1 and/or UE 115b-1 detecting the discovery signal of UE 115a-1. In operation of the illustrated example, protected resources may be provisioned such that UE 115a-1 is not scheduled to transmit on an uplink of the protected resource, is not scheduled to transmit on an uplink of the protected resource when UE 115b-1 is scheduled for communication using the shared resource, etc. The protected resources may be determined implicitly (e.g., based on the discovery signal of UE 115b-1), or explicitly. Additionally or alternatively, protected resources may be provisioned such that UE 115b-1 is not scheduled to transmit on an uplink of the protected resource, is not scheduled to transmit on an uplink of the protected resource when UE 115a-1 is scheduled for communication using the shared resource, etc. The protected resources may be determined implicitly (e.g., based on the discovery signal of UE 115a-1), or explicitly.

In the example illustrated in FIG. 6B, UE to UE interference is detected by UE 115a-1 detecting the discovery signals of UEs 115b-1 and 115b-2 and/or UEs 115b-1 and 115b-2 detecting the discovery signal of UE 115a-1. Further, eNB to UE interference is detected by eNB 105b detecting the discovery signal of UE 115a-1. In operation of the illustrated example, protected resources may be provisioned such that UE 115a-1 is not scheduled to transmit on an uplink of the protected resource, is not scheduled to transmit on an uplink of the protected resource when UEs 115b-1 and 115b-2 are scheduled for communication using the shared resource, etc. The protected resources may be determined implicitly (e.g., based on the discovery signal of UE 115b-1 and/or UE 115b-2), or explicitly. Additionally or alternatively, protected resources may be provisioned such that UEs 115b-1 and 115b-2 are not scheduled to transmit on an uplink of the protected resource, is not scheduled to transmit on an uplink of the protected resource when UE 115a-1 is scheduled for communication using the shared resource, etc., and such that eNB 105b is not scheduled to transmit on a downlink of the protected resource, is not scheduled to transmit on a downlink of the protected resource when UE 115a-1 is scheduled for communication using the shared resource, etc. and/or an antenna beam directed away from UE 115a-1 is utilized to transmit on a downlink of the protected resource by eNB 105b. The protected resources may be determined implicitly (e.g., based on the discovery signal of UE 115a-1), or explicitly.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 4A-4C may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for providing radio resource management in a wireless communication system, the method comprising:
   identifying, by a first network element associated with a first cell, information including timing offset information associated with a discovery signal based on the discovery signal detected from a second network element associated with a second cell; and
   provisioning, based at least in part upon the information associated with the discovery signal detected, one or more protected resources.

2. The method of claim 1, wherein the first network element comprises a user equipment (UE).

3. The method of claim 1, wherein the one or more protected resources are provisioned to avoid an instance of dominant interference by at least one network element associated with the first cell with respect to wireless communications in the second cell.

4. The method of claim 1, wherein the one or more protected resources comprise a time slot.

5. The method of claim 4, wherein the time slot is provisioned for a blank time resource, downlink communication, or uplink communication.

6. The method of claim 4, wherein the time slot is provisioned according to a dedicated sequence.

7. The method of claim 4, wherein the one or more protected resources further comprise a frequency, a channel, a power resource, or a spatial control resource.

8. The method of claim 1, wherein the second network element comprises a base station serving one or more UEs associated with the second cell.

9. The method of claim 1, further comprising:
   reporting, by the first network element, the information including timing offset information associated with the discovery signal for facilitating provisioning the one or more protected resources.

10. A non-transitory computer-readable medium having program code recorded thereon for providing radio resource management in a wireless communication system, the program code comprising:
    program code for causing one or more computers to:
       identify, by a first network element associated with a first cell, information including timing offset information associated with a discovery signal based on the discovery signal detected from a second network element associated with a second cell; and
       provision, based at least in part upon the information associated with the discovery signal detected, one or more protected resources.

11. The non-transitory computer-readable medium of claim 10, wherein the program code for causing one or more computers to:
    monitor for transmission of one or more discovery signals from network elements associated with the second cell.

12. The non-transitory computer-readable medium of claim 10, wherein the program code further comprises program code for causing one or more computers to:
    determine one or more protected resources when the discovery signal is detected by the first network element.

13. The non-transitory computer-readable medium of claim 10, wherein the first network element comprises a base station or a user equipment (UE), and wherein the second network element comprises a UE served by a base station of the second cell.

14. The non-transitory computer-readable medium of claim 10, wherein the one or more protected resources comprise a time slot.

15. The non-transitory computer-readable medium of claim 14, wherein the time slot is provisioned as a blank time resource.

16. The non-transitory computer-readable medium of claim 14, wherein the time slot is provisioned for downlink communication.

17. The non-transitory computer-readable medium of claim 14, wherein the time slot is provisioned for uplink communication.

18. The non-transitory computer-readable medium of claim 14, wherein the time slot is provisioned according to a dedicated sequence.

19. The non-transitory computer-readable medium of claim 14, wherein the one or more protected resources further comprise a frequency.

20. The non-transitory computer-readable medium of claim 14, wherein the one or more protected resources further comprise a power resource.

21. The non-transitory computer-readable medium of claim 14, wherein the one or more protected resources further comprise a spatial control resource.

22. An apparatus for providing radio resource management in a wireless communication system, the apparatus comprising:
    at least one processor; and
    a memory coupled to the at least one processor, wherein the at least one processor is configured:
       to identify, by a first network element associated with a first cell, information including timing offset information associated with a discovery signal based on the discovery signal detected from a second network element associated with a second cell; and
       to provision, based at least in part upon the information associated with the discovery signal detected, one or more protected resources.

23. The apparatus of claim 22, wherein the at least one processor is configured to analyze the detected discovery signal to identify a portion of resources shared by the first and second cells for determining the one or more protected resources.

24. The apparatus of claim 22, further comprising:
    an antenna, wherein the one or more protected resources are provisioned such that an antenna beam corresponding the antenna is utilized to transmit on a downlink of the one or more protected resources.

25. The apparatus of claim 22, further comprising:
    a receiver configured to receive the discovery signal.

26. The apparatus of claim 22, further comprising:
    a transmitter configured to transmit the information to a base station associated with the first network element.

27. A method for providing information for radio resource management in a wireless communication system, the method comprising:
    detecting, by a user equipment (UE) associated with a first cell, transmission of a discovery signal from a network element associated with a second cell;
    reporting, by the UE, information including timing offset information associated with the discovery signal for facilitating provisioning one or more protected resources; and
    receiving, by the UE, provisioning of one or more protected resources, the provisioning of the one or more protected resources based at least in part upon the information reported by the UE.

28. The method of claim 27, wherein the one or more protected resources is provisioned for such that the UE is not scheduled to transmit on an uplink associated with the one or more protected resources.

29. The method of claim 27, wherein the one or more protected resources is provisioned for such that the UE is not scheduled to transmit on a downlink associated with the one or more protected resources.

30. The method of claim 27, wherein the protected resources comprise a portion of resources shared by the first and second cells identified for providing protection with respect to the second cell.

* * * * *